United States Patent

[11] 3,633,419

[72] Inventors: Yukio Arita;
Yoshiaki Nakao, both of Hiroshima;
Takashi Iwai, Saiki-gun; Koozoo Tagaya,
Hiroshima, all of Japan
[21] Appl. No. 881,710
[22] Filed Dec. 3, 1969
[45] Patented Jan. 11, 1972
[73] Assignee Mitsubishi Jukogyo Kabushiki Kaisha, Tokyo, Japan
[32] Priority Dec. 11, 1968
[33] Japan
[31] 43/90750

[54] EXPERIMENTAL BASIN AND MEANS FOR TESTING BEHAVIORS OF OFFSHORE MARINE STRUCTURES
2 Claims, 10 Drawing Figs.

[52] U.S. Cl. .................................................. 73/148, 73/432 SD
[51] Int. Cl. .................................................. G01m 10/00
[50] Field of Search .......................................... 73/147, 148, 432 SI; 35/19 R

[56] References Cited
UNITED STATES PATENTS
2,663,092 12/1953 Laurent et al. ............... 73/148
3,478,444 11/1969 Presnell et al. ............... 73/148
FOREIGN PATENTS
137,025 1961 U.S.S.R. ...................... 73/148

Primary Examiner—S. Clement Swisher
Attorney—Otto John Munz

ABSTRACT: A basin for testing the effect of a marine platform or similar marine structure characterized by providing a long basin, a wave-forming means provided at one end of said long basin, a wave damper at the other end thereof, a water circulation channel extending along the outside of said basin to communicate with the bottom of each end of said basin in the proximity of each end, a water-feeding means to move the water in said channel in at least one direction and thereby to produce a stream or current as desired in the water in said basin.

INVENTOR.
YUKIO ARITA ET AL

BY *Otto John Neumz*
ATTORNEY

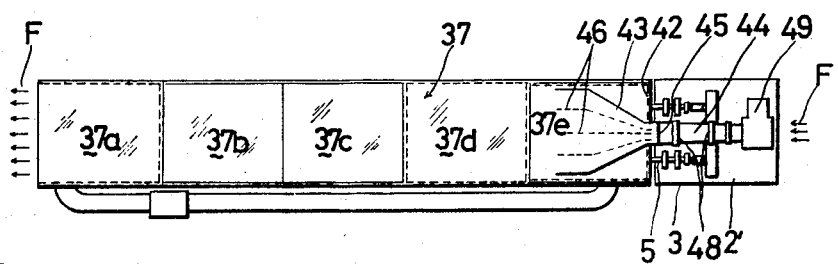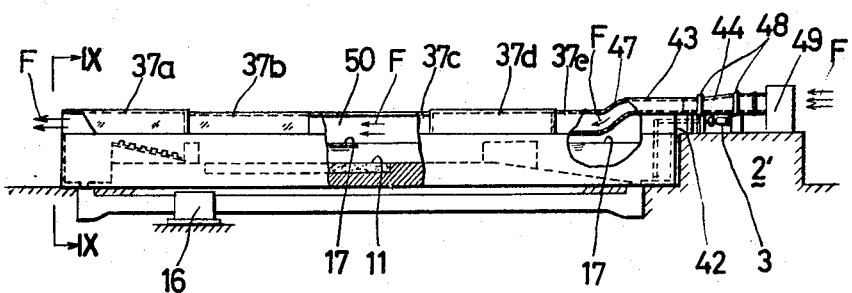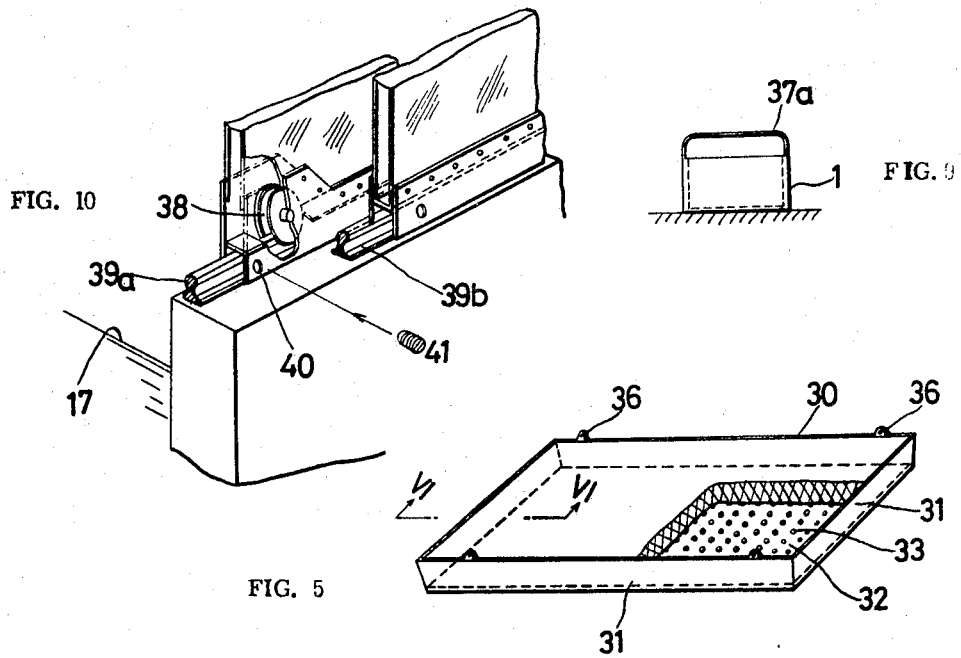

EXPERIMENTAL BASIN AND MEANS FOR TESTING BEHAVIORS OF OFFSHORE MARINE STRUCTURES

BACKGROUND OF THE INVENTION

The present invention relates to a model basin and its apparatus for use in testing the influences of the wind, waves and tidal currents on marine structures which are afloat and moored by some means onto the sea bottom, or remain constantly stationary thereon, and also in experimentally testing the behaviours of sea bottom soil conditions which will be created by the action of waves and tidal currents with respect to the marine structure.

While the majority of disasters experienced with such marine structures heretofore are known to have been caused by the failure in their lower hull portions sitting on the sea bottom or their portions embedded stationary in the sea bottom, no systematic studies, whether qualitative or quantitative, have yet been undertaken to determine more accurate characteristics of the factors causing such failure so that the specialist in this line is obliged to follow the practice of designing and constructing marine platforms, etc. only on the basis of data obtained from some previous investigations. For the purpose of exploring vast continental shelves and to effectively exploiting offshore natural resources, there is a growing tendency of demand for an experimental elucidation of various behaviours which interactively occur between the marine structure engaged in exploitation activities of the kind and natural phenomena such as the elucidation of the influences of the wind, waves and tidal currents under various weather conditions and behaviours and correlation factors between various sea bottom soils and marine structures operating while sitting on the sea bottom, or being moored or fixed thereto.

SUMMARY OF THE INVENTION

The present invention is intended to provide an experimental basin which is capable of reproducing changes in weather and sea conditions by possible composition of the factors of such structures liable to occur at sea, and to elucidate the effects the marine structure suffers under all weather and sea conditions and the correlation between the marine structure and various sea bottom soils.

In order to achieve the above-mentioned purpose, the experimental basin and means of the present invention are basically characterized by the provision of a long water basin, wave-forming means disposed in a longitudinal direction at one end of said long water basin, wave-damping means disposed at the other end, circulating water passages mutually communicating with each other outwardly of said water basin near the bottom of both ends of said basin, and water-feeding means so disposed as is capable of transferring the water in said circulating water passages in at least one direction. Other supplemental characteristics of the invention go on as follows. Namely, in the experimental basin of the type described above, there are provided waterflow-regulating means for producing uniform waves and water flows in the direction of the width of the water basin, said waterflow-regulating means being provided with such wings as are adjustably pivotable around a vertical line. At the same time, there are formed a recess portion in the central bottom of said experimental basin for holding sand collected from the sea bottom for testing purposes and a dish-shaped bin for holding sand collected from the sea bottom, said dish-shaped bin being adapted to be inserted in said recess in a freely removable manner. In addition, there are provided a wind cavity in the form of a flow passage in a longitudinal direction on the surface of water in said experimental basin and wind-feeding means capable of forming an airflow in at least one direction.

This experimental basin full of water can be used for causing waves of any size (length, height, and frequency) and tidal currents of any velocity and direction at a time and moreover, by simultaneously causing wind in a suitable direction on the surface of water, it is made possible to synthesize any tidal currents, their followup waves, facing waves and phenomena of marine weather of various wave heights in the experimental basin in an easy manner. Sill furthermore, by providing sea bottom sand separately composed beneath such surface of water in the experimental basin, it is also made possible to synthesize water conditions formed with bottom surfaces of various properties.

Consequently, by maintaining a marine structure model of a size consistent with the size of said experimental basin afloat in any direction therein or mooring or securing it to the bottom thereof, it is also made possible to experimentally study the correlatively interacting aspects of the marine structure and waves, tidal currents and sea bottom sand under such conditions as are considered almost natural.

A few embodiments of the invention will be explained in detail with reference to the attached drawings.

BRIEF DESCRIPTION OF THE DRAWINGS

FIG. 5 shows a perspective view of an example of a bin containing sand collected from the sea bottom and being provided in this experimental basin.

FIG. 7 shows a plan view of an alternative example of the same.

FIG. 8 shows a side view of FIG. 7.

FIG. 9 shows a side view seen from the plane defined by the line IX—IX of FIG. 8.

FIG. 10 shows an enlarged perspective view of the example in part as shown in FIG. 8.

DETAIL OF THE INVENTION

Figure 1:
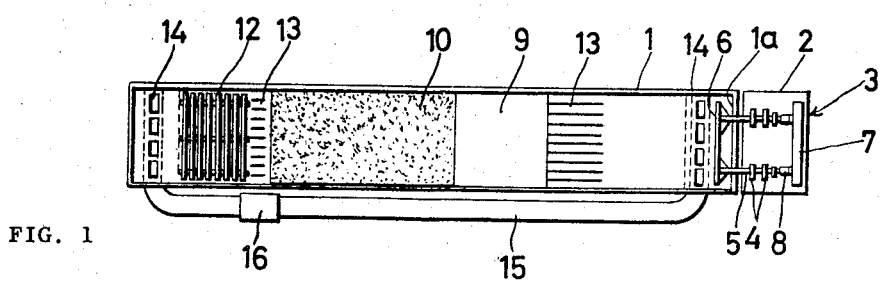
FIG. 1 shows a plan view of a preferred embodiment of this invention.
Figure 2:
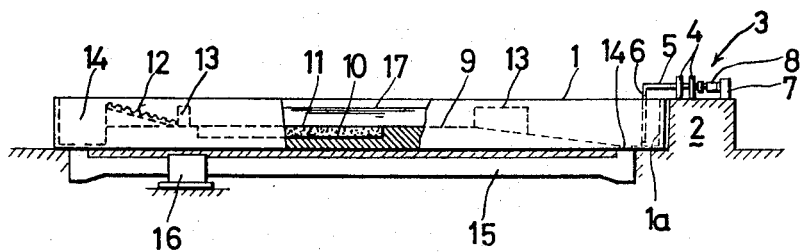
FIG. 2 show a side view of the same.

FIGS. 1 and 2 show an embodiment, No. 1 in which reference 1 indicates a plan view of a long and narrow horizontal basin, 2 a foundation provided adjacent the outside of the one end of the basin at the same level with the wall of the basin, 3 wave-forming means provided on the foundation 2 which is composed of the following members; a pair of axially directed reciprocating shafts 5, 5 supported by bearings in the lengthwise direction of the basin 4, 4 on the foundation 2, wave-forming plates 6 fixed to the foremost ends of the shafts 5, 5 and arranged in parallel with the wall 1a of basin 1, a pair of actuators 8, 8 fixed to the wall 7 of the foundation 2 and placed between the wall 7 and the rearmost ends of the shafts 5, 5 to give the shafts 5, 5 a reciprocal movement in the lengthwise direction, and a control mechanism (not shown) capable of driving said actuators to make a synchronized movement at any rate of speed and distance. The water basin 1 is formed with a bottom portion 9 which is flat at the central part thereof and is inclined downwardly to show deepest at one end provided with said wave-forming plates 6 almost reaching the bottom, and the other end thereof is adapted to have its deepest bottom as shown in the drawing (FIG. 2). In a part of the flat bottom near the center of the water basin, there is provided a recess 10 uniform in depth to contain, up to the same level with the flat bottom, sand 11 synthesized in conformity with the conditions of the sea bottom in the manner as described hereinbelow. Reference 12 shows a lattice (grid)-shaped wave damper which is graded to incline inwardly, and reference 13 flow regulators (stream-conditioning means) consisting of a number of plates provided in parallel with the sidewalls of the basin with their lowermost ends fixed to the bottom in positions in front of the wave damper and somewhat inwardly spaced from the wave generator.

The aforesaid flow regulators 13, 13 consisting of a plurality of parallel plates may be replaced by ones of the gate or network type provided in a crosswise direction in the water basin. Said recess 10 is formed between the two flow regulators 13, 13 and extends crosswise fully up to the sidewalls of the basin. Reference 14 shows a plurality of openings uniformly distributed in a crosswise direction of the basin at the deepest part of the bottom at both ends of the basin, reference 15 shows a water-circulating channel communicating with said openings from the bottom of the both ends and situated at the outside of the basin, and reference 16 shows a water-feeding means capable of transferring water within said channel in either direction as desired at any selected speed. Each end of the water-circulating channel 15 is divided into a plurality of sectionally uniformed branch channels, which are connected to openings 14 at both ends of the basin and by operating the water-feeding means 16 substantially equal quantities of water can be ejected or injected from the openings 14. Reference 17 shows the surface of the water level when the basin 1 is filled with water.

In this type of experimental facility, the water filled in the basin 1 and the water-circulating channel 15 flows when driven by water-feeding means 16 to pass through the openings 14 at one end of the basin, entering into the basin and flowing in the basin in a lengthwise direction and again returning to the channel 15 after passing through the openings 14 at the other end of the basin. By the way, such circulation of water can be adjusted in any direction at any rate of speed as regulated by water-feeding means. Passing through the flow-regulating plates 13, the water flows in the basin substantially at an equal flow rate all over the range in a crosswise direction. When driven by the wave-generating means 3, the water filled in the basin is given a wave form which moves toward the other end of the basin, and this wave form before reaching the other end is damped by passing through the lattice-shaped wave damper 12 to eliminate the counter action of the wave form caused by impacting the basin wall.

By simultaneously driving the aforesaid wave-generating means 3 and water-feeding means 16, a composition of wave and current can be produced in the basin. In the above-mentioned example, by subjecting the marine structure contracted in 1/N to the wave height and length contracted in 1/N, and the wave frequency and flow rate contracted in 1/N, the conditions simulating the correlation between the marine structure and the wave current can be synthesized in the basin.

For example, in a basin which has an effective width 5 m., an effective depth 1 m., and an appropriate length, it is possible to conduct a model test of a structure having an actual dimension within 100 m. by 100 m. scaled down to a range of 1/10 to 1/200 and in this instance the effective depth of 1 meter of the basin corresponds to about 200 m. in depth of the sea. In this basin, the model marine structure reduced in scale as described above is subjected to waves and tidal currents synthesized in the basin by wave-forming means 3 and water-feeding means 16 simulating the sea conditions, for example, a wave form, 15 m. high, 150 m. long, 15 sec. or less in frequency, and tidal current less than 2 m. per sec.

On the other hand, several types of sea bottom soil can be prepared outside of the basin to simulate the actual sand found at the bottom of the sea and before filling the basin with water, one of these synthesized sands is placed in a vat or the recess 10 as seen in FIG. 2. By doing so, under sea conditions involving bottom soils, waves and tidal currents can be synthesized to simulate the actual undersea conditions as desired.

Therefore, by using this model basin, a marine platform or other structure connected in some way or other with the sea bottom can be tested by using a model reduced in scale according to the dimensions of the basin to determine the correlation of the marine structure and the waves, tidal currents and bottom soils under the conditions simulating the actual condition at sea. Furthermore, the effect of waves and tidal currents on the part of the marine structure appearing above the water and on the structure afloat can be studied by testing with this plant provided the influences of the wind are not taken into account.

Figure 3:
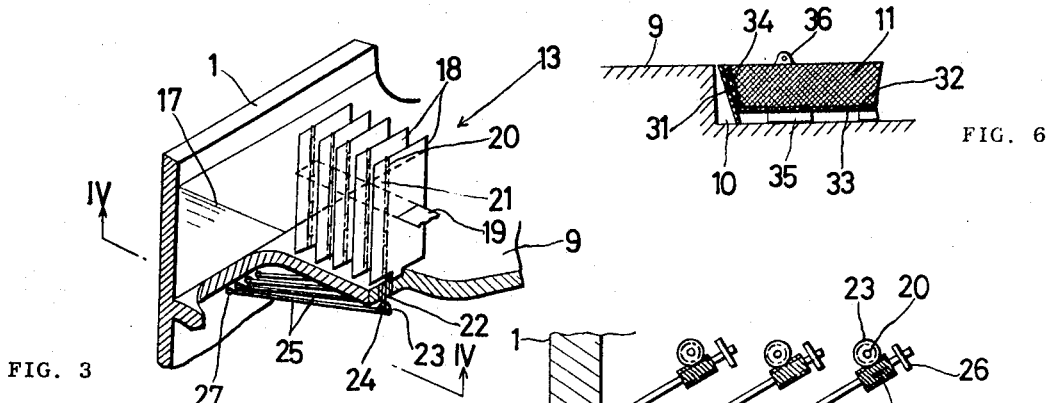
FIG. 3 shows a perspective view of an example of flow-regulating means provided in a plant, according to the present invention.
Figure 4:
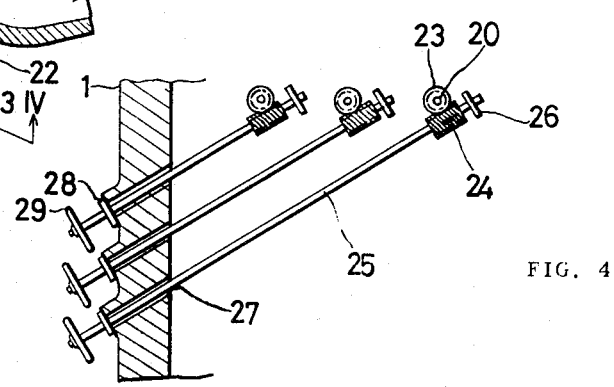
FIG. 4 shows a cross section of the same taken along the line IV–IV of FIG. 3.

FIGS. 3 and 4 show another example of the flow regulating means 13 seen in FIGS. 1 and 2. As seen in the drawing, a plurality of plates 18 are spaced at equal intervals in the crosswise direction of the basin in parallel with its sidewalls with their legs fixed to the bottom 9, the crosspiece 19 serves to secure the plates 18 to the sidewall at at least one point apart from the bottom 9, a vertical shaft 20 is provided at one end in the lengthwise direction of each plate 18 in a manner capable of rotation, and the movable blade 21 is secured to said vertical shaft at one end and is capable of rotating with the shaft 20. The vertical shaft 20 is supported by a watertight bearing 22 at the bottom 9 of the water basin passing through the bottom 9 to reach the underside and having a small gear 23 fixed at the head. One end of the shaft 25 of a worm 24 engages the small gear 23 being supported by a bearing 26 fixed at the underside of the basin, and the other ends of a plurality of the shafts 25 extend in an inclined direction against the sidewall of the basin and after passing freely through inclined holes 27 and supported in a position close to the sidewall by bearings 28 fixed to the outer side of the sidewall and at the end of the shafts, these shafts are found to have handles 29 at their ends.

By manual rotation of the selected handle 29, shaft 25 and the end of the worm 24 are permitted to rotate, thus causing the small gear 23 engaging said worm 24 to rotate thereby turning and mounting the vertical shaft 20 and movable blade 21 in the desired direction and position.

To operate the movable blade 21, an electric motor or any other well-known mechanism may be used.

By adjusting each movable blade at a predetermined position, this flow-regulating means is capable of giving the water in the basin a uniform flow rate in a crosswise direction or change flow distribution in the crosswise direction or a uniform flow only in the desired width. Therefore, in the basin equipped with such flow regulating means as seen in FIGS. 1 and 2, it is feasible to synthesize the conditions involving sand, waves, water stream having the desired flow rate distribution in the manner as desired and thereby to make experiments of the model marine structure under condition simulating the actual sea conditions.

Figure 6:
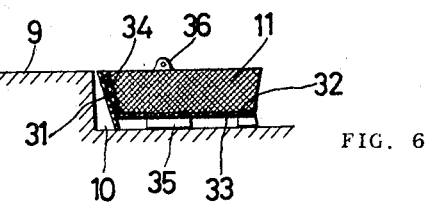
FIG. 6 shows a cross section of the same taken along the line VI—VI of FIG. 5.

FIGS. 5 and 6 show a detachable bin to contain bottom soils 11 which can be used in place of the building bin or recess 10 shown in FIGS. 1 and 2. As shown in the drawing, the bin 30 is built of side plates 31 inclined outwardly and bottom plate 32 with many perforated holes 33 arranged in series to release water, a reinforcement 34 is secured to the inside of the sideplate 31 properly spaced and a hook 36 is provided at each corner of the sideplate 31 of bin 30 for use in hoisting the bin 30. As shown in FIG. 6, the bin 30 is so built as to show the same depth as the recess 10 and to leave a slight spacing between the upper edge of the bin and that of the recess. When necessary, more than two bins 30 of the kind may be placed side by side in the recess 10.

Outside of the basin, the soil is wetted into a pasty state and is placed in the bin 30 and compacted to have the state of soil simulate the actual bottom soil. Several types of bottom soil of different property are synthesized and placed in the bins of similar construction. The bin 30 containing the bottom soil thus synthesized is suspended by hoisting by means of cables fixed to the hooks 36, then quietly lowered into the basin filled with water and placed in the recess 10. When the soil in the bin is a little too soft, it is advisable to protect the surface of the soil in the bin by covering with some sheet which can be taken off quietly after the bin has been placed in the recess. The bin thus placed in the recess can be raised quietly and replaced with another bin 30 containing the desired type of soil.

Preparation by synthesis of a type of bottom soils simulating the actual bottom soils takes a considerable number of days. Moreover, it may sometimes be found difficult to move the bottom soil synthesized outside of the water basin into the recess in the basin without changing the quality of the soil, and the refilling of a different type of soil into the recess usually takes a considerable period of time and labor.

By using the aforesaid bottom sand bin, the bottom sand can be placed into the recess 10 or taken out from the same while the testing basin is filled with water and since the bottom sand synthesized and compacted is replacable as it is contained in the bin without changing its property, experiments in the basin plant using this model can be effected with excellent results.

FIGS. 7 through 9 show still another example of this experimental basin. This basin is provided with a hood above to form a wind tunnel in a lengthwise direction on the water level of the basin so that wind is produced in either direction as desired by a blower connected with the tunnel. In the drawing, the hood 37 is provided on the top of the basin 1, same as the basin as shown in FIGS. 1 and 2. Hood 37 is subdivided into several parts in the lengthwise direction, namely 37a, 37b, 37c, 37d, 37e, each made of a transparent material forming a tunnel which is supported at the bottom on the sidewall of the basin. Hoods 37a and 37d are made slightly larger in size in a manner capable of loosely overlapping the other hoods, 37b, 37c and 37e, and excepting the hood 37e, the other hoods, 37a, 37b, 37c and 37d are equipped at the bottom with a plurality of wheels 38. Double tracks 39a, 39b are laid on sidewall of each side of the water basin in such a manner as the hoods 37b and 37c can travel on an inner track 39a and the hoods 37a and 37d travel on an outer track 39b in the lengthwise direction of the basin by means of the wheels 38. The hoods 37b and 37c travel through the inside of the hoods 37a and 37b while the hoods 37a and 37d travel over the outside of the hoods 37b and 37c. The hoods 37a through 37d are all provided with screw holes 40 and by means of screws 41 all hoods 37a through 37d can be fixed to the tracks 39a and 39b. The rearmost hood 37e is provided with an end wall 42 and a ventilation duct 43 formed by the upper part of the hood and is adapted to fit onto the rear end of the basin and also to the inner track 39a in an appropriate manner. The end wall 42 has an opening for enabling the movable shaft 5 of wave-forming means 3 to pass freely therethrough, and the duct 43 is provided with a connecting mouth 45 which can be attached to, or detached from, a stationary duct 44 placed on the foundation 2, and the other end of the cut 43 is fully expanded to form an interior space of the hood 37e. Vertical guide vanes 46 are provided at equal intervals to partition the spacings in the duct 43 and horizontal guide vanes 47 are provided to streamline the connection between the space in the duct 43 and that in the hood.

The stationary duct 44 is firmly installed by means of tables 48, 48 in the center of a foundation 2' which is larger in space than that in the plant shown in FIGS. 1 and 2, and the stationary duct 44 is, at the other end, connected with a reversible blower 49 installed on the foundation 2'. The aforementioned hoods 37a through 37e are arranged and fixed to the sidewalls of the basin with their edges overlapping each other to form a wind tunnel 50 extending in a lengthwise direction over the water surface 17 in the hoods. By driving the blower 49 in one direction, wind is produced to blow at the desired velocity in the direction as shown by the arrow F in the drawing and when the blower 49 is driven in the reverse direction the wind is produced to blow in the contrary direction. By means of the duct 43 the guide vanes 46, 47 wind is produced in the wind tunnel 50 at a uniformly distributed flow rate in a crosswise direction.

When replacing the bottom soil sample in the basin or placing the model of structure in the basin, a proper opening can be made above the basin by removing the screw 41 and sliding the hoods 37a through 37d on the track to the positions as desired. In this case, the opening can be made by hood 37e by crane after hood 37d has been moved to some other place. By using this experimental basin, it is feasible to produce water currents in the desired direction and at the velocity as required by water-feeding means 16 and also to produce waves as desired by wave-forming means 3 with the selected bottom soil sample placed in the basin, and at the same time, to produce wind to blow over the water surface 17 in the desired direction and at the desired rate of speed along the lengthwise direction in the basin.

Therefore, by using this basin and a scaled down marine structure model the user can study the correlation between the marine structure and effects from the nature of the sea bottom, wind waves, and tidal currents under simulated conditions.

Besides, in each of the aforesaid examples, a plurality of the recesses 10 of the kind may be provided to improve easy handling and also to increase the number of available experiments.

As explained in detail hereinbefore with reference to the above examples, this experimental basin will prove highly useful for researchers in synthesizing various conditions in the basin simulating the actual sea conditions by combining waves, tidal currents, sea bottom soil and/or wind reproduced as desired and by using a model marine structure, to determine the relationship between the marine structure and such factors as wind waves, tidal currents and seal bottom to the entire satisfaction of engineers engaged in this field.

We claim:

1. A basin for testing the effect of a marine platform or similar marine structure comprising: a long basin;
   a wave-forming means provided at one end of said long basin;
   a wave damper at the other end thereof;
   a water circulation channel extending along the outside of said basin to communicate with the bottom of each end of said basin in the proximity of each end;
   a water-feeding means to move the water in said channel in at least one direction and thereby to produce a stream or current in the water in said basin;
   said waterflow-regulating means provided with movable blades adjustably pivotable around a vertical line.

2. A basin for testing the effect of a marine platform or the like, as set forth in claim 1, further comprising: a recess in the proximity of the central bottom part of said basin and a removable dish-shaped bin for holding bottom sand for testing purposes, said bin being adapted to be inserted in said recess.

* * * * *